United States Patent [19]

Powderley et al.

[11] Patent Number: 4,586,231
[45] Date of Patent: May 6, 1986

[54] MANUFACTURE OF METAL ARTICLES FROM WIRE

[75] Inventors: John Powderley; Ronald W. Evans, both of Birmingham, United Kingdom

[73] Assignee: USM Corporation, Framington, Conn.

[21] Appl. No.: 732,954

[22] Filed: May 13, 1985

[30] Foreign Application Priority Data

May 19, 1984 [GB] United Kingdom ................ 8412882

[51] Int. Cl.⁴ ......................... B23P 17/00; B21K 1/58
[52] U.S. Cl. ........................................ 29/416; 29/413; 10/27 R; 10/27 E
[58] Field of Search .................... 10/11 R, 27 R, 27 E; 29/416, 413, 415

[56] References Cited

U.S. PATENT DOCUMENTS

| | | | |
|---|---|---|---|
| 2,466,811 | 4/1949 | Huck | 411/501 |
| 2,501,567 | 3/1950 | Huck | 411/501 |
| 3,919,874 | 11/1975 | Harris | 10/11 R |
| 4,059,860 | 11/1977 | Fick | 10/11 R |
| 4,459,256 | 7/1984 | Ziegler | 29/416 |
| 4,506,426 | 3/1985 | Booker | 29/413 |

Primary Examiner—Howard N. Goldberg
Assistant Examiner—Steven Nichols
Attorney, Agent, or Firm—Alan N. McCartney

[57] ABSTRACT

A multipart article comprising a rod or pin (26) with a sleeve or collar (58) on it is made from one piece of wire by parting off a blank, impact extruding a stem to form the pin or rod, backward extruding a residual portion of the blank to form the sleeve or collar with an internal diameter slightly larger than the diameter of the stem and joined to the stem by a short thin web (64), and then fracturing the web and inserting the pin or rod into the thus separated sleeve or collar.

The advantage in manufacturing small articles on a mass production basis is in the economy of forming two parts in one machine operation rather than making them separately, an example being parts of a blind-riveting assembly.

8 Claims, 23 Drawing Figures

Fig_1

Fig_2

Fig_3

Fig_14

Fig_15

Fig_16

Fig_17

Fig_18

Fig_19

Fig_20

Fig_21

Fig_22

Fig. 23

MANUFACTURE OF METAL ARTICLES FROM WIRE

FIELD OF INVENTION

This invention is concerned with the manufacture of metal articles from wire, and more particularly with articles of a kind comprising a metal rod or pin with a separate sleeve or collar on it.

An example of an article comprising a metal pin with a separate sleeve on it is a blind-riveting assembly. The expression "blind-riveting assembly" is used herein to denote an assembly of a type comprising a rivet and a mandrel, the mandrel having a stem with expansion means (which may be be an integral head or may comprise an integral head or swelling with an expansion sleeve on or adjacent to it) at one end, part of the stem lying within a tubular portion of the rivet and part, remote from the expansion means, projecting from a head flange at one end of the rivet, the expansion means of the mandrel being too large to pass through the tubular portion of the rivet without deforming it, and the arrangement being such that said expansion means and the tubular portion of the rivet may be inserted through a hole in a workpiece from one side in such a manner that the head flange of the rivet abuts the workpiece at said one side and part of the tubular portion of the rivet adjacent said expansion means of the mandrel projects from the other side, and the rivet set by pulling the mandrel stem at said one side of the workpiece while holding the head flange of the rivet against the workpiece, thereby causing the expansion means of the mandrel to effect radial expansion of the tubular portion of the rivet at the other side of the workpiece.

The most common variety of blind-riveting assembly is one in which the expansion means is a head of the mandrel integral with the stem, the mandrel head being exposed adjacent to the tail end of the rivet. Such an assembly is usually made by a method comprising the separate manufacture of mandrel and rivet and their subsequent assembly together in an assembly machine to the operating locality of which they are fed by hand or automatically from separate hoppers. The separate handling of the mandrels and rivets and the provision of special purpose machines for their assembly accounts for a significant proportion of the manufacturing cost of the assemblies.

In GB patent specification No. 738741 there is described a process for manufacturing blind-riveting assemblies of what is known as the sealed type where the expansion means is constituted by the mandrel head, which is enveloped by the rivet shank, having been introduced into a hollow, closed-ended, rivet blank in the course of making the rivet. In that process, the mandrel and rivet are united in a step which includes the formation of the rivet shank around the mandrel stem. The mandrel itself being thus present and becoming integrated with the rivet at a stage which is essential in the course of making the rivet, the process can be regarded as effecting an economy compared with one which involves the assembly operation as an additional step to the manufacture of the individual rivet and mandrel.

An advantage of making blind-riveting assemblies by assembling rivets and mandrels which have been made separately, or by introducing the separately made mandrels in a manufacturing step of the rivet production, is that the materials of the rivet and mandrel can be different and chosen with full regard to the purposes the two parts have to fulfil. But where it is desired to provide an assembly of two parts, for example a rivet and mandrel, where the same material is acceptable for both parts, separate manufacture and handling of the parts and their subsequent assembly can be seen potentially to involve costly and superfluous operations.

It has been proposed, in GB patent specification No. 1066033, to provide the expansion means of a blind riveting assembly in the form of an expansion sleeve assembled on the mandrel stem adjacent an integral head on the mandrel, the sleeve being threaded over the mandrel between the head of the latter and the tail end of the tubular rivet which is also threaded over the mandrel, the arrangement being such that during the placement operation the mandrel head first forces the sleeve into the rivet thus expanding the projecting tail part of the latter and so clenching the work pieces together, after which the mandrel head enters the non-projecting part of the rivet within the workpiece to plug the rivet and expand the non-projecting part of the rivet into tight contact with the work pieces. Although, as stated in the specification, the resulting blind-riveting assembly affords positive locking of the self plugging mandrel head over a wide range of combined workpiece thicknesses, the assembly comprises three separately made pieces which have to be assembled together, a potentially more expensive manufacturing procedure than that for the conventional two piece assembly. Such potential additional manufacturing cost may be a significant reason for the three piece assembly never, so far as we are aware, having being adopted commercially.

It is an object of the present invention to provide an improved method of making a metal article (for example a blind-riveting assembly) comprising two parts, a rod or pin and a separate sleeve or collar, of the same material in which the separate manufacture, handling and subsequent assembly of the two parts is avoided.

SUMMARY OF THE INVENTION

The foregoing object is achieved in accordance with the invention in that there is provided a method of making a metal article comprising a rod or pin with a separate sleeve or collar on it of the same material as the rod or pin, comprising axially extruding a substantial length of a cylindrical blank to provide a stem of the rod or pin, subjecting a residual larger diameter portion of the blank to extrusion around a punch which results in a cylindrical sleeve or collar with an internal diameter slightly greater than that of the adjacent portion of the extruded stem, and joined to the stem by a short thin annular web, fracturing said web and inserting said adjacent portion of the rod or pin into the thus separated sleeve or collar.

A method in accordance with the invention may be used in the manufacture of a blind-riveting assembly where the sleeve or collar is to serve as the rivet, or where the sleeve or collar is to serve as an expansion sleeve adjacent the mandrel head. In the latter case, the rivet would be made separately and is not therefore restricted to being of the same material as the mandrel.

The invention also provides a metal article comprising a rod or pin with a separate sleeve or collar on it made from a single blank in a manner as set out in the last preceding paragraph but one.

Preferably, for example where the two-part assembly is to be used in a blind-riveting assembly, after insertion of the rod or pin into the sleeve or collar, a projecting end portion of the pin or collar is upset to prevent its withdrawal through the sleeve or collar without deforming the sleeve or collar.

Preferably also, for example where the two-part article is to be used in a mandrel in assembly with a rivet of a three-part blind-riveting assembly, after initial axial extrusion of a blank, a greater part of the length of the stem is subjected to further reduction in diameter, while leaving a less reduced portion adjacent the sleeve or collar, which is subsequently inserted into the sleeve or collar. The separation of the sleeve or collar from the rod or pin may be effected by pushing the rod or pin through an annular shoulder which arrests advance of the sleeve or collar, causing its separation from the rod or pin, such separation being followed by insertion of said less reduced portion of the rod or pin into the sleeve or collar. Furthermore, the said annular shoulder may be provided in advance of an extrusion bridge which reduces the diameter of said greater part of the length of the stem as aforesaid. Insertion of said reduced portion of the rod or pin preferably results in this portion extending beyond both ends of the sleeve or collar, and this portion is subjected to axial pressure so that it expands radially to fill the sleeve or collar and overlap at least its inner wall at each end.

Successive operations on a blank in a method according to the invention are preferably carried out at successive stations of a multistage forming machine, the blank being initially parted off from wire at a first station of the machine.

Where the two-part article is to serve as a mandrel in a blind-riveting assembly, it is preferably subjected to a rolling operation to introduce features, for example a break neck, which may be desired for the purpose.

If the article is to serve as a two-piece blind-riveting assembly, the sleeve or collar is preferably subjected to an operation to provide it with a head flange at its end adjacent the stem of the rod or pin, and a portion of the rod or pin projecting from the other end of the sleeve or collar is upset to prevent its withdrawal through the sleeve or collar without deforming the sleeve or collar.

It will be seen that the manufacture of two-part articles of the same material from wire or rod in accordance with the invention thus avoids the separate manufacture, handling and subsequent assembly of the two parts.

BRIEF DESCRIPTION OF THE DRAWINGS

There now follows a description, to be read with reference to the accompanying drawings, of two methods of making a two-part metal article in accordance with the invention, the first of these methods being described in detail and being concerned with the manufacture from wire of a two-part mandrel for a three-piece blind-riveting assembly, the second method being concerned with the manufacture of a two-piece blind-riveting assembly. These two methods have been selected for description to illustrate the invention by way of example and not of limitation.

In the accompanying drawings.

DESCRIPTION OF THE PREFERRED EMBODIMENT

Figure 1:
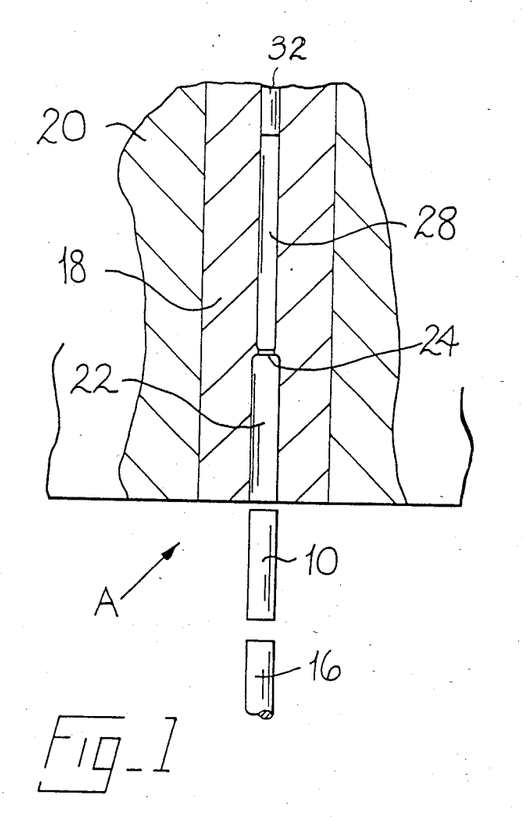
FIGS. 1, 4, 7, 10 and 14 are fragmentary representations of co-operating punches and dies at successive stations (hereinafter referred to as A, B, C, D and E respectively) of a multistage forming machine tooled up for use in carrying out the first illustrative method, the punches and dies being mounted on a ram (not shown) common to all the stations and the punches being shown retracted with the product to be worked on poised for insertion into the dies.
Figure 2:
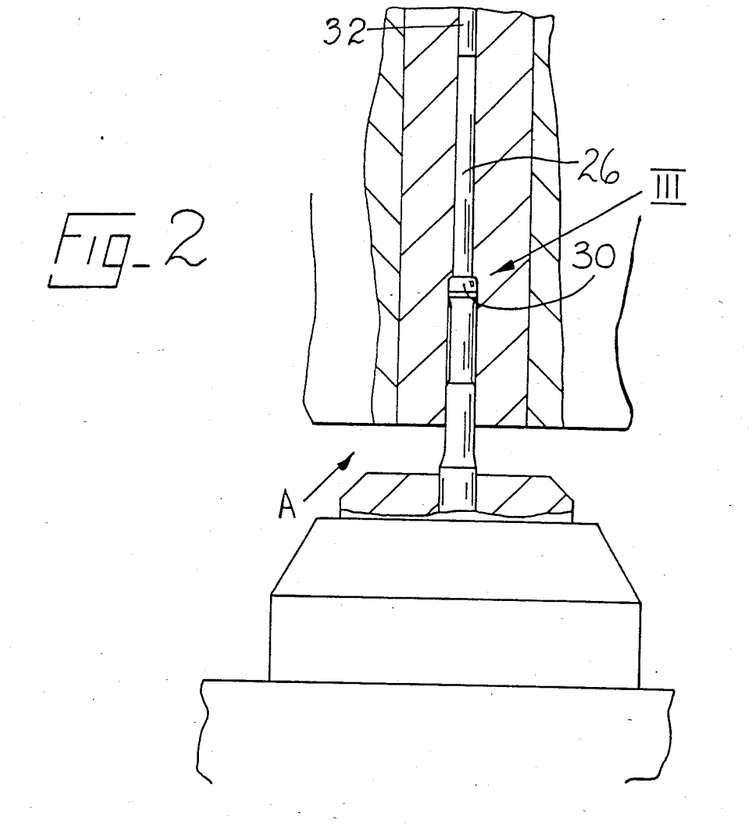
FIGS. 2, 5, 8, 11 and 15 are similar representations of the punches and dies of FIGS. 1, 4, 7, 10 and 14 respectively at the end of an operative stroke of the ram.
Figure 3:
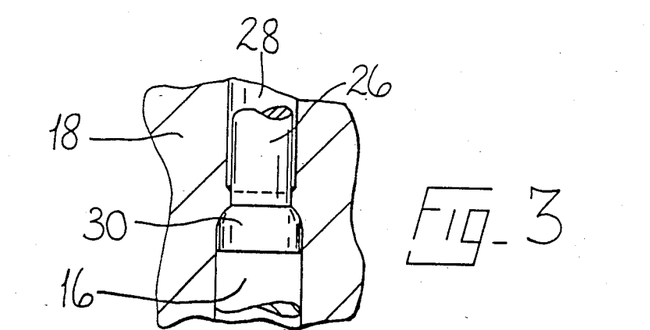
FIGS. 3, 6, 9, 13 and 16 are fragmentary enlargements of portions of the tools and product identified by the arrows III, VI, IX, XIII and XVI in FIGS. 2, 5, 8, 12 and 15 respectively.
Figure 4:
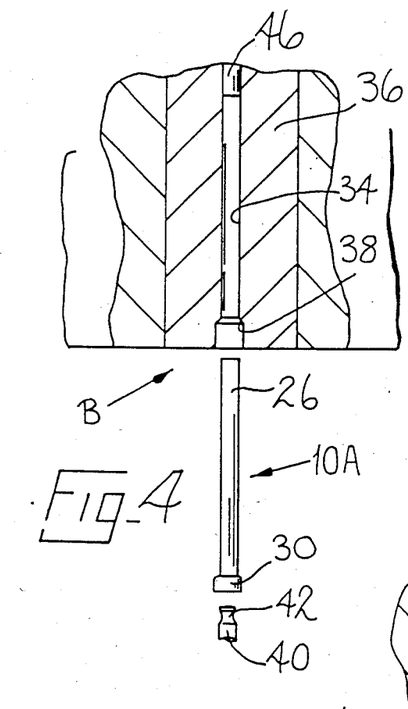
Figure 5:
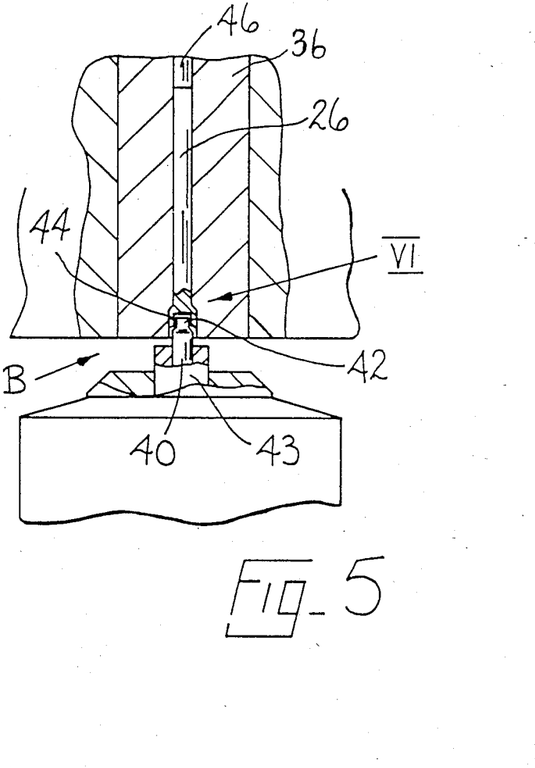
Figure 6:
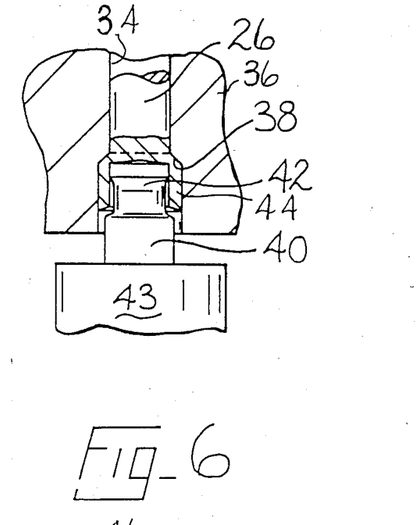
Figures 7, 8, 9:
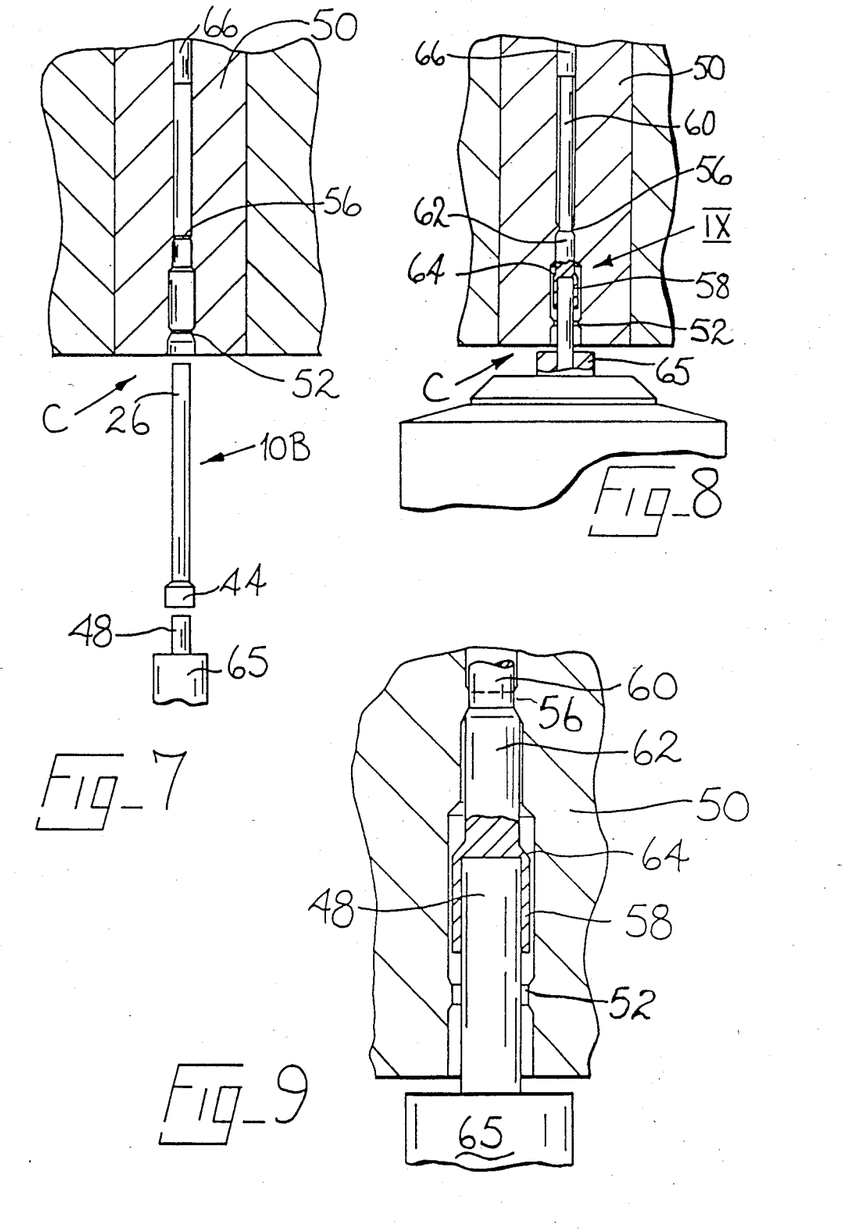
Figure 10:
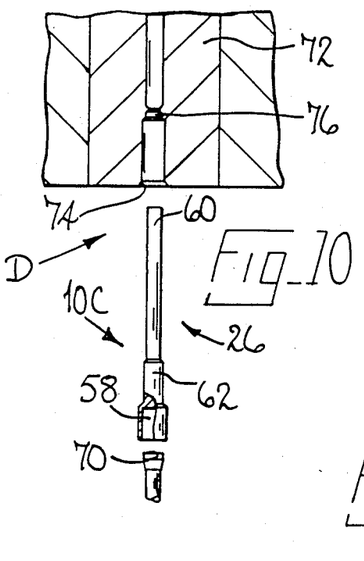

The first illustrative method is concerned with the manufacture from a cylindrical blank 10 (FIG. 1) of a two-piece mandrel 12 which is subsequently assembled with a rivet 14 to complete the three-piece blind-riveting assembly shown in FIG. 17. Successive operations on the blank 10 take place at operating stations A, B, C, D and E of a multistage forming machine and thereafter in a rolling machine and rivet assembly machine. The stations A to E of the forming machine are represented in FIGS. 1 to 16, there being at each station a die set which is held stationary and a punch set carried on a reciprocating ram. Fragmentary portions of the tooling are shown in the drawings. For convenience, FIGS. 1, 4, 7, 10 and 14 show the punches and dies at stations A, B, C, D, and E respectively with the punches retracted. FIGS. 2, 5, 8, 11 and 15 show them respectively with the punches fully advanced. The blank 10 depicted in FIG. 1 as poised for insertion into the die at station A is seen in FIG. 4 in the form referred to as 10A in which it is ejected from station A, poised for insertion into the die at station B. Accordingly, through the sequence of drawings, the blank 10 is seen at 10A, 10B, 10C, and 10D at the stages to which it has been progressively formed at stations A, B, C, and D of the multistage forming machine, and at 12 in the blind-riveting assembly of FIG. 17 after its forming has been completed at station E and it has been rolled. Transfer mechanism of the forming machine is not shown in the drawings.

The blank 10, in carrying out the first illustrative method, is parted from steel wire 6.0 mm diameter at an initial station of the multistage forming machine and transferred to station A (FIGS. 1, 2 and 3) where a flat-ended punch 16 pushes the blank 10 into a die 18 held stationary in the die support 20. The die 18 has a large diameter bore portion 22 long enough to accommodate the blank 10, which is 25 mm long, an annular extrusion bridge 24 which reduces the cross-sectional area of the blank for the greater part, viz. 22 mm, of the length of the original blank, to produce by impact extrusion a stem 26 of the mandrel 47 mm long and 4.25 mm in diameter. The stem 26 is received in a bore portion 28 of the die 18, while an unextruded portion 30 of the blank of larger diameter (viz. 6 mm) remains in the bore portion 22. On retraction of the punch 16, the blank 10A is ejected from the die 18 by an ejector 32 and transferred to station B.

At station B (FIGS. 4, 5 and 6) the blank 10A is received in a bore 34 of a die 36 which has an annular shoulder 38, part of a cone of included apical angle of 100°, against which the unextruded portion 30 of the blank 10A comes to bear at the same time as it engages an ejector 46, the blank having been pushed into the die by a punch 40 which has a reduced end portion 42 which is 4.3 mm in diameter and more than 3.5 mm long. Continued advance of the punch 40 after the blank has been arrested causes backward extrusion of the portion 30 of the blank around the portion 42 of the punch to provide a hollow cylindrical portion 44 which is approximately 3.5 mm long. On retraction of the punch, the blank 10B is ejected by the ejector 46, removed from the punch by a stripper 43 and transferred to station C.

At station C (FIGS. 7, 8 and 9) the blank 10B is pushed by a punch 48 into a die 50 which has a first extrusion bridge 52 of 6.6 mm diameter, slightly less than the external diameter of the portion 44 of the blank 10B. Further into the die 50 is a second extrusion bridge 56 which reduces the stem to 3.9 mm diameter for 43 mm of its length. Thus, as a result of being pushed into the die, the blank, shown at 10C in FIG. 10, has a hollow cylindrical portion 58, 5.8 mm long, a stem portion 60 which is 43 mm long reduced to 3.9 mm diameter, and a less reduced portion 62 which is 12 mm long and 4.3 mm diameter adjacent the portion 58 and connected thereto by a short thin annular web 64. The product is ejected by an ejector 66 when the punch retracts, and stripped from the punch by a stripper 65.

Figure 11:
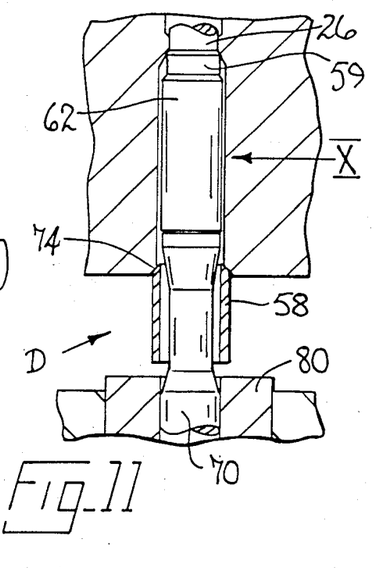
Figure 12:
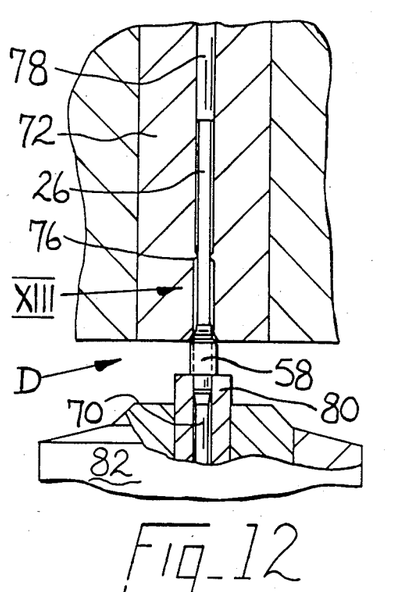
FIG. 12 is a view similar to FIG. 11 showing parts at station D just after the ram has begun to retract from the die holder in an operative cycle of the machine.
Figure 13:
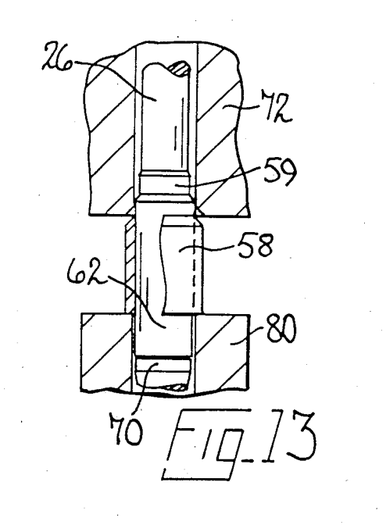

The blank 10C is transferred to station D (FIGS. 10, 11, 12 and 13) where it is pushed by a spring-loaded punch 70 into a die 72 which has at its open end an annular shoulder 74 to arrest the hollow cylindrical portion 58 of the blank. The punch 70 is of a diameter to be admitted freely into the portion 58 so its continued advance fractures the web 64. Meanwhile, the stem portion 60 has passed through a further extrusion bridge 76 to reduce its diameter to 3.6 mm. At this stage, the internal diameter of portion 58 is the same, nominally, as the portion 62 of the blank, and the punch has advanced through the portion 58, which is now separate from the stem 26 (FIG. 11). The operation of the machine is now effective to advance an ejector 78 to cause the pin 26 to release the sleeve 58 (which has been separated from it), from the die 72 and then to insert the portion 62 of the stem 26 of the blank into the sleeve 58, the sleeve 58 engaging a hollow stripper 80 surrounding the punch 70, while the punch yields against its spring pressure; this insertion occurs as the punch holder 82 begins to retract (FIG. 12). The blank 10D (FIG. 14) now consists of a pin 26 with a major part 60 of its length reduced to 3.6 mm diameter, a small residual part 59 at 3.9 mm, and a less reduced portion 62, shorter than the part 60 and with a diameter not greater than 4.3 mm, at one end, and, on the portion 62, the sleeve 58 a short distance from the end of the pin 26 so as to leave about 3.7 mm length of the portion 62 of the pin projecting. At the other end of the sleeve 58, about 2.5 mm of the portion 62 is exposed.

At station E (FIGS. 14, 15 and 16), the blank 10D is advanced by a heading tool 82 mounted to reciprocate with the ram, into a die 84 which has an annular step 86 at the entrance to an axial bore, there being an annular extrusion bridge 88 close behind the step. Pushing the blank through the bridge 88 slightly reduces the residual part 59 of the stem 26 to 3.6 mm diameter, the same as the rest of the stem. The step 86 arrests the sleeve 58.

Figures 14, 15, 16:
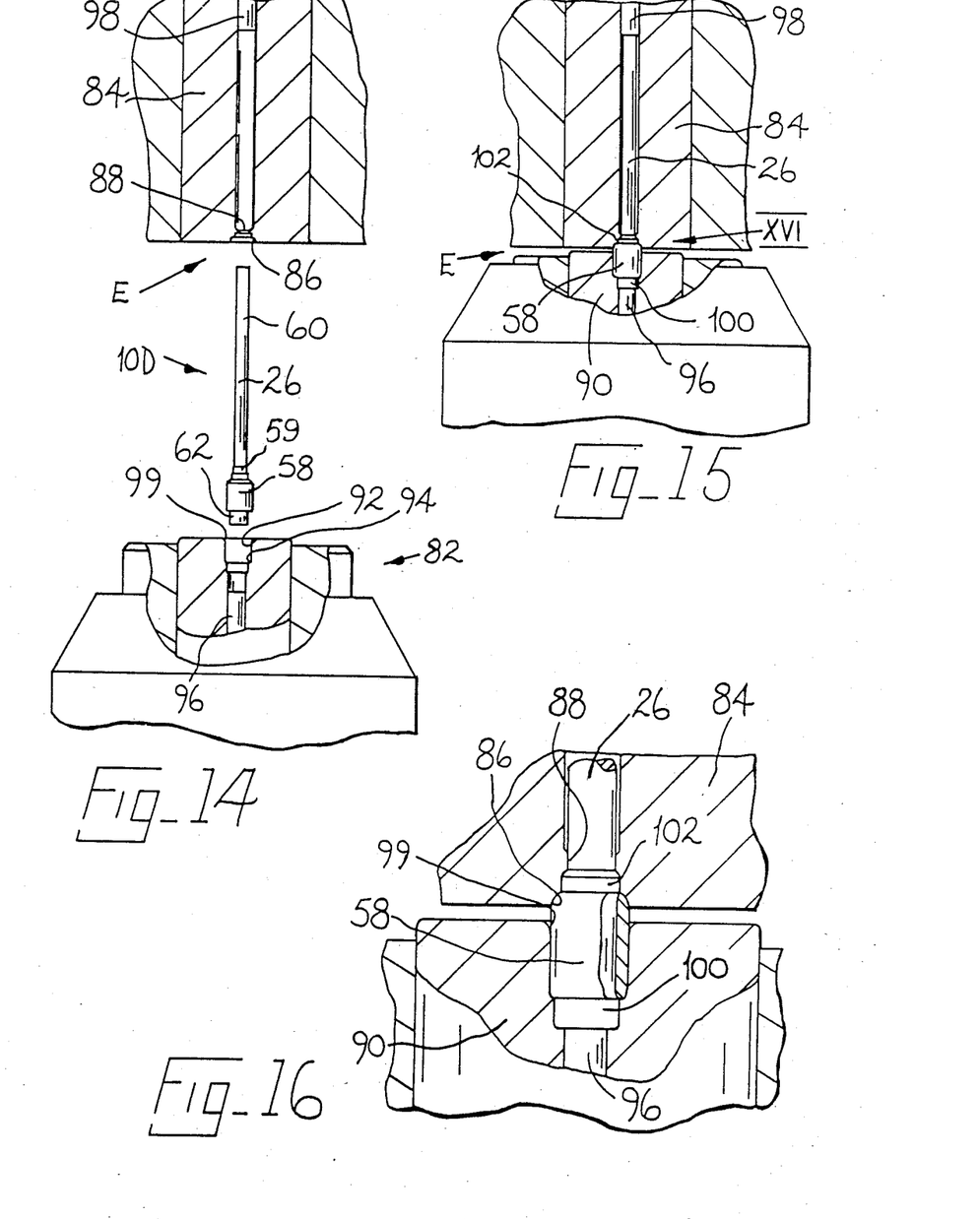

The heading tool 82 comprises a sleeve 90 which has a flared mouth 99 leading to a cylindrical bore 92 of a diameter, at its open end, to reduce slightly the sleeve 58, and with an annular conical shoulder 94 to abut the end of the sleeve 58 when the tool is advanced, the bore continuing at a smaller diameter to receive the less reduced end portion 62 of the pin 26 and accommodate a reciprocable punch 96. The sleeve 90 can yield against spring pressure when it meets excessive resistance, and this the sleeve 90 does when it presses the sleeve 58 up to the annular step 86. There then results from the residual stroke of the punch 96 upsetting of the portion 62 of the pin 26 above and below the sleeve 58, to form at the end of the pin a terminal flange or swelling 100 to prevent the projecting end portion passing through the sleeve 58 without deforming it and radial expansion of the portion 62 at 102 at the other end of the sleeve 58 to ensure ejection of the product from the die 84 by the ejector 98. Expansion of the portion 62 within the sleeve 58 also occurs, consolidating the assembly.

With ejection of the product from station E of the multistage forming machine, the blank 10E is transferred from the machine to a thread-rolling machine (not shown) suitably tooled up to provide the reduced portion 60 the stem 26 with features desired for its purpose of serving as a two-piece mandrel in a three-piece blind-riveting assembly. These features as shown in FIG. 17 represent an annular locking groove 104 close to the less reduced portion 62, a break neck 106 spaced 2 mm from the locking groove, longitudinal splines 108 to co-operate with a rivet on assembly, and annular grooves 110 along a tail end portion of the mandrel stem to facilitate gripping by a collet of a rivet-setting tool. The rolling of the locking groove 104 in a portion the blank leading from the portion 62 to the fully reduced stem 60 results in increase of the diameter of the portion 62 at that end to 4.35 mm.

Figure 17:
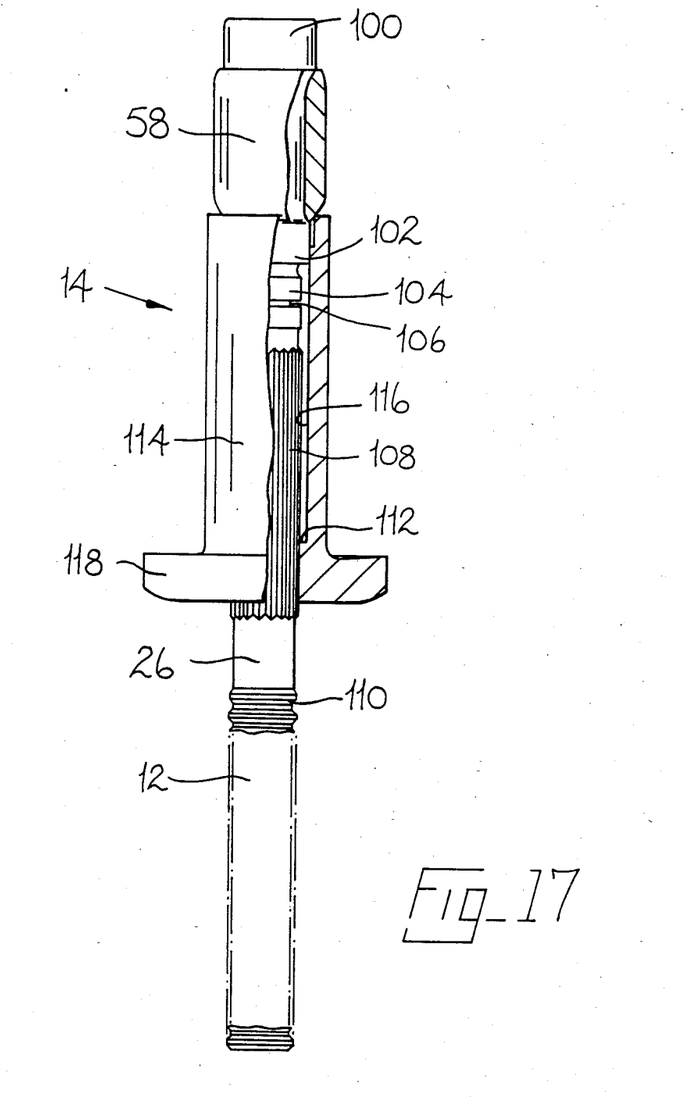
FIG. 17 is a view, partly in section and on a larger scale than FIG. 1, of the three-piece blind-riveting assembly made in carrying out the first illustrative method.

The rolled mandrel shown at 12 in FIG. 17 may then be selectively heat treated, and assembled with a mild steel rivet 14 to complete the three-piece blind-riveting assembly.

The rivet 14 has a tubular shank 114 of external diameter 6.35 mm with a head flange 118 at one end and a bore 116 right through the shank. The internal diameter of the shank 114 over most of its length is 4.35 mm. At the tail end of the rivet, the bore diameter is increased to 4.8 mm over a length of 2 mm. At a locality immediately below the head flange 118, the bore 116 is reduced in diameter to 3.7 mm at an internal annular shoulder 112 normal to the axis with a sharp inner edge. Through the head flange, the bore increases again to 4.1 mm.

Figure 18:
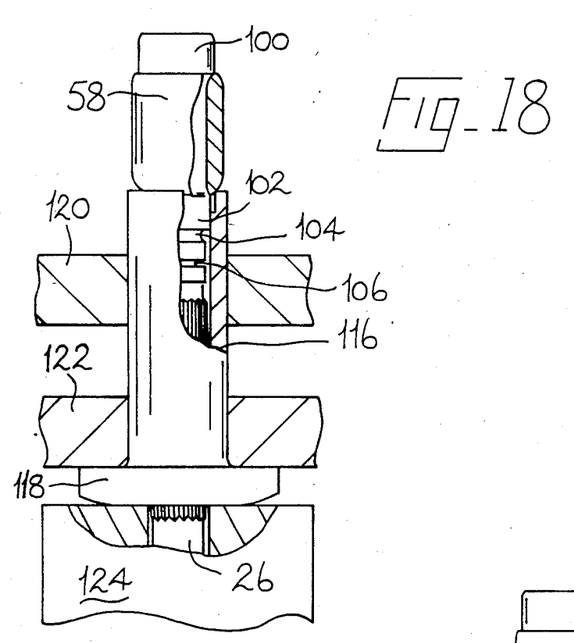
FIGS. 18, 19 and 20 shows successive stages in the setting of the illustrative blind-riveting assembly of FIG. 17.
Figure 19:
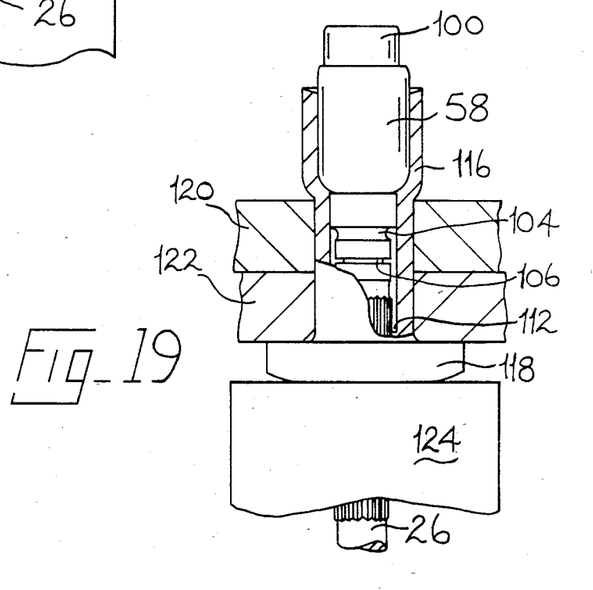
Figures 20, 21, 22:
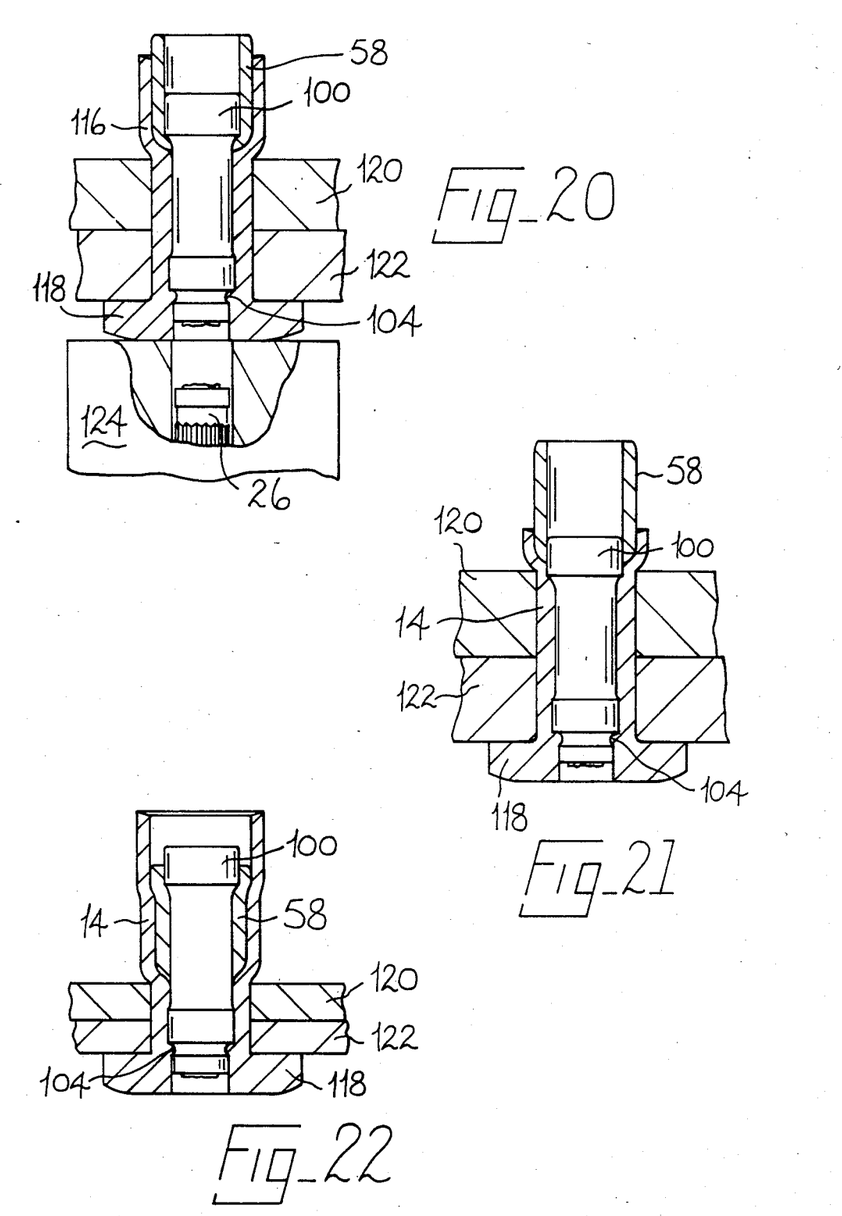
FIGS. 21 and 22 show thick and thin workpieces respectively joined together by the illustrative blind-riveting assembly of FIG. 17.

The manner of setting of the illustrative blind-riveting assembly which has been described is depicted progressively in FIGS. 18, 19 and 20. FIG. 18 shows the rivet 14 of the assembly inserted into aligned holes of two plates 120, 122 which may be undesirably spaced apart. A nosepiece 124 (which may have a flat end face) of a conventional blind-rivet setting tool 12 abuts the head flange 118 of the rivet to hold it against the plate 122 and the mandrel stem 26 of the assembly is pulled by collet jaws of the tool. As pulling proceeds, the sleeve 58 expands the rivet shank 116 progressively along its length causing it to draw the remote plate 120 towards the plate 122 until they are firmly clamped, as in FIG. 19. When the sleeve 58 meets greater resistance sufficient to overcome that afforded both by the swelling 100 and the aforementioned consolidation of the pin 26 and sleeve 58, its progress is arrested and the terminal flange 100 of the mandrel is drawn into the sleeve 58, which expands accordingly, thereby causing more expansion of the rivet shank. The mandrel stem continue to advance until the leading end of the portion 58 comes into engagement with the shoulder 112 and forces material of the rivet into the locking groove 104 of the mandrel, thus greatly increasing resistance of the mandrel stem to further advance. As a result the mandrel stem breaks at the break neck 106, which is within the rivet head.

Thus, it is a feature of this illustrative assembly that the mandrel will always break within the rivet, and the remaining part become locked there to reinforce the rivet without leaving a broken off part projecting, regardless of the thickness of the workpiece over a wide range. This feature can be recognised by comparing FIG. 21 in which the rivet is shown in a thick workpiece, the sleeve 58 having travelled only a short way into the rivet and the terminal flange 100 of the mandrel a long way into the sleeve, with FIG. 22 where the workpiece is thin and the sleeve 58 has travelled a long way into the rivet but the flange 100 only a short way into the sleeve, the mandrel stem having advanced substantially the same distance in both cases.

It will be seen that the three-piece blind-riveting assembly herein described has been obtained by taking the products from only two separate manufacturing operations and assembling them together, the pin and sleeve for the mandrel from one, and the rivet from the other, rather than from separate operations for all three, with the consequential economy that is thereby achieved.

Figure 23:
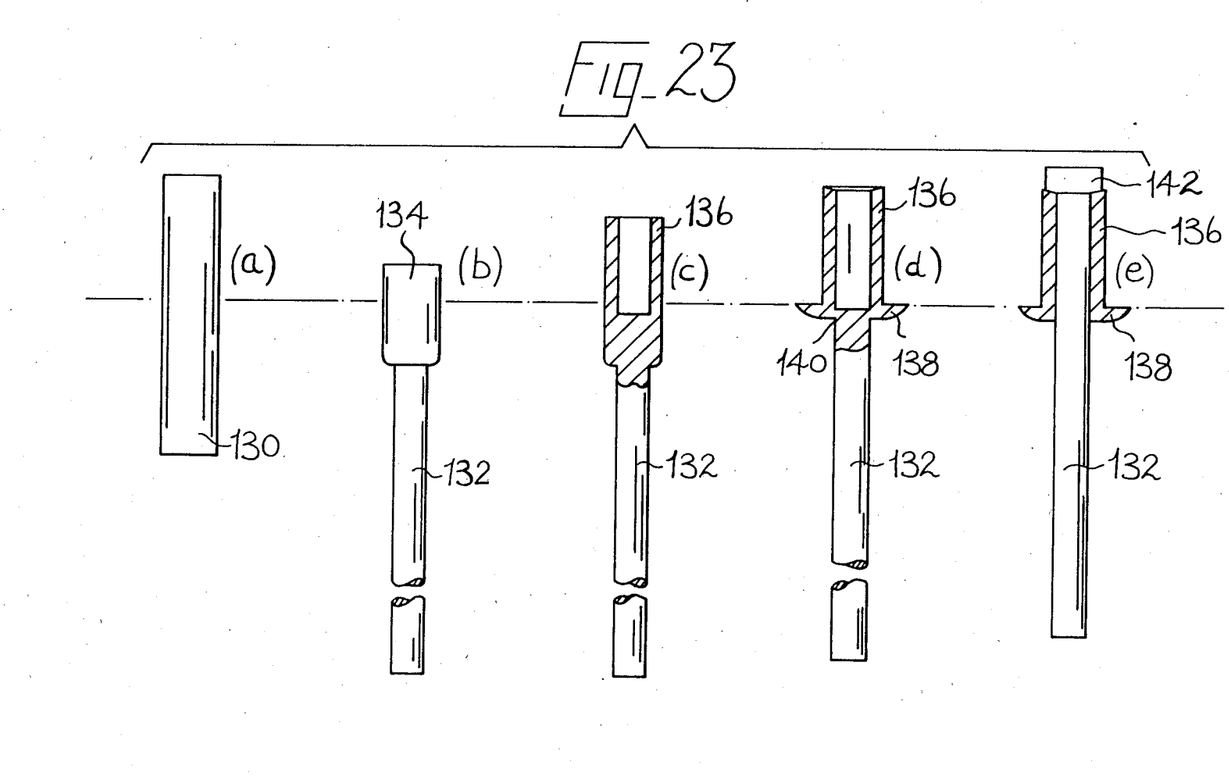
FIG. 23 represents diagrammatically successive forming operations in carrying out the second illustrative method to produce a two-piece blind-riveting assembly from one piece of wire.

In carrying out the second illustrative method, depicted diagrammatically in FIG. 23, similar operations for a two-piece blind-riveting assembly are undertaken progressively at successive stations (a), (b), (c), (d) and (e) in a multistage forming machine with suitably modified tooling. Thus, referring to FIG. 23, a cylindrical blank 130 is parted off from wire at (a), subjected at (b) to impact extrusion to provide a long stem 132 of reduced diameter and a remaining unextruded portion 134, and part of the remaining unextruded portion 134 of the blank is subjected at (c) to backward extrusion to provide a sleeve 136 of internal diameter slightly greater than that of the stem 132. At (d), the sleeve 136 is lengthened by further extrusion and an intermediate unextruded portion is upset to form a head flange 138 and leave a short thin web 140. The web 140 is then fractured and the sleeve, or rivet 136, 138, pushed over the mandrel stem 132. A short projecting portion of the mandrel stem 132 is then upset at (e) to provide a mandrel head 142 and complete the formation of the two-part blind-riveting assembly. Provision may be made, if desired, to form a break neck (not shown) in the mandrel stem 132 before fracturing the web 136 so that it will lie inside the rivet.

We claim:

1. A method of making a metal article comprising a rod or pin with a separate sleeve or collar on it of the same material as the rod or pin, comprising axially extruding a substantial length of a cylindrical blank to provide a stem of the rod or pin, subjecting a residual larger diameter portion of the blank to extrusion around a punch which results in a cylindrical sleeve or collar with an internal diameter the same or slightly greater than that of the adjacent portion of the extruded stem, and joined to the stem by a short thin annular web, fracturing said web and inserting said adjacent portion of the rod or pin into the thus separated sleeve or collar.

2. A method according to claim 1 wherein, after insertion of the rod or pin into the sleeve or collar, a projecting end portion of the rod or pin is upset to prevent its withdrawal through the sleeve or collar without deforming the sleeve or collar.

3. A method according to claim 1 wherein after initial axial extrusion of the blank, a greater part of the length of the stem is subjected to further reduction in diameter, while leaving a less reduced portion adjacent the sleeve or collar, which is subsequently inserted into the sleeve or collar.

4. A method according to claim 3 wherein separation of the sleeve or collar from the rod or pin is effected by pushing the rod or pin through an annular shoulder 74 which arrests advance of the sleeve or collar, causing its separation from the rod or pin, such separation being followed by insertion of said less reduced portion of the rod or pin into the sleeve or collar.

5. A method according to claim 4 wherein insertion of said less reduced portion of the rod or pin into the sleeve or collar results in said less reduced portion extending beyond both ends of the sleeve or collar, and this portion is subjected to axial pressure so that it expands radially to fill the sleeve or collar and overlap at least its inner wall at each end.

6. A method according to any one of the preceding claims wherein the stem of the rod or pin of the resulting two-piece article is subjected to a rolling operation to introduce a break neck required for it to serve as a mandrel in a three-piece blind-riveting assembly.

7. A method according to claim 6 wherein a rivet is assembled on the mandrel with its tail end adjacent the sleeve or collar.

8. A method according to claim 1 wherein the sleeve or collar is subjected to an operation to provide it with a head flange at its end adjacent the stem of the rod or pin, and a portion of the rod or pin projecting from the other end of the sleeve or collar is upset to prevent its withdrawal through the sleeve or collar without deforming the sleeve or collar so that the resulting article can serve as a two-piece blind-riveting assembly.

* * * * *